United States Patent
Reuschel et al.

(10) Patent No.: US 9,815,399 B2
(45) Date of Patent: Nov. 14, 2017

(54) VEHICLE HAVING A LIGHTING DEVICE WITH AN ELONGATE LIGHTING UNIT

(71) Applicant: Audi AG, Ingolstadt (DE)

(72) Inventors: Jens Dietmar Reuschel, Ingolstadt (DE); Johannes Tovar, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/032,607

(22) PCT Filed: Oct. 25, 2014

(86) PCT No.: PCT/EP2014/002882
§ 371 (c)(1),
(2) Date: Apr. 27, 2016

(87) PCT Pub. No.: WO2015/067353
PCT Pub. Date: May 14, 2015

(65) Prior Publication Data
US 2016/0250963 A1    Sep. 1, 2016

(30) Foreign Application Priority Data

Nov. 8, 2013 (DE) .......................... 10 2013 018 784

(51) Int. Cl.
*B60Q 1/00* (2006.01)
*B60Q 1/26* (2006.01)
(Continued)

(52) U.S. Cl.
CPC ............ *B60Q 1/0035* (2013.01); *B60Q 1/26* (2013.01); *B60Q 1/2665* (2013.01); *B60Q 1/50* (2013.01);
(Continued)

(58) Field of Classification Search
CPC .......... B60Q 1/0035; B60Q 1/52; B60Q 1/26; B60Q 1/2665; B60Q 1/50; B60Q 1/00;
(Continued)

(56) References Cited

U.S. PATENT DOCUMENTS 5,984,497 A * 11/1999 Foerstner ............. B60Q 1/0011
                                                          362/511
6,685,325 B1 * 2/2004 Hulse ................... B60Q 1/2665
                                                          359/879
(Continued)

FOREIGN PATENT DOCUMENTS

CN           2590803 Y      12/2003
DE        103 23 320 A1     12/2004
(Continued)

OTHER PUBLICATIONS

International Search Report, dated Apr. 24, 2015, for International Application No. PCT/EP2014/002882, 3 pages.
(Continued)

*Primary Examiner* — Joseph L Williams
*Assistant Examiner* — Jose M Diaz
(74) *Attorney, Agent, or Firm* — Seed Intellectual Property Law Group LLP

(57) ABSTRACT

The present invention relates to a vehicle (1), particularly a motor vehicle, with at least one illuminating device having a longitudinally shaped illuminating fixture for creating a light strip along a defined line of the illuminating fixture, wherein a first section (2, 2') of the illuminating fixture is arranged on the interior (3) of the vehicle (1) and a second section (4, 4') of the illuminating fixture is arranged on the exterior (5) of the vehicle, the illuminating device is set up so as to create a similar light strip along a line of the first (2, 2') and of the second section (4, 4') of the illuminating fixture, and the light of the light strip created by the first (Continued)

section (2, 2') of the illuminating fixture is radiated such that it is visible for an occupant located at a definable position on the interior of the vehicle (1), and the light of the light strip created by the second section (4, 4') of the illuminating fixture is radiated such that it is visible from a definable position relative to and outside of the vehicle (1).

10 Claims, 1 Drawing Sheet

(51) Int. Cl.
*B60Q 1/50* (2006.01)
*B60Q 1/52* (2006.01)
*B60Q 3/64* (2017.01)
*B60Q 3/78* (2017.01)
*B60Q 3/80* (2017.01)

(52) U.S. Cl.
CPC ............... *B60Q 1/52* (2013.01); *B60Q 3/64* (2017.02); *B60Q 3/78* (2017.02); *B60Q 3/80* (2017.02)

(58) Field of Classification Search
CPC .. B60Q 1/0041; B60Q 1/0058; B60Q 1/0425; B60Q 1/32; B60Q 1/323; B60Q 3/80; B60Q 3/64; B60Q 3/78; B60Q 3/00; F21S 48/218; F21S 48/2275
See application file for complete search history.

(56) References Cited

U.S. PATENT DOCUMENTS

| | | | |
|---|---|---|---|
| 8,215,810 B2 | 7/2012 | Welch, Sr. et al. | |
| 9,004,731 B2 | 4/2015 | Pfeil | |
| 9,310,041 B2 | 4/2016 | Pfeil | |
| 9,656,601 B2* | 5/2017 | Evans | B60Q 1/2665 |
| 2005/0174792 A1* | 8/2005 | Matsuura | B60Q 1/0011 362/511 |
| 2009/0066255 A1 | 3/2009 | Nakayama et al. | |
| 2011/0013411 A1* | 1/2011 | Sakiyama | B60Q 1/2665 362/494 |
| 2011/0170304 A1* | 7/2011 | Fujita | G02B 6/0008 362/501 |
| 2013/0229814 A1* | 9/2013 | Pfeil | G02B 6/001 362/493 |
| 2016/0103269 A1* | 4/2016 | Narita | G02B 6/002 362/617 |
| 2016/0152178 A1* | 6/2016 | Peterson | B60Q 3/18 315/77 |

FOREIGN PATENT DOCUMENTS

| | | |
|---|---|---|
| DE | 10 2006 009 636 A1 | 9/2007 |
| DE | 20 2008 017 074 U | 4/2009 |
| DE | 10 2008 064 022 A1 | 9/2009 |
| DE | 10 2009 039 556 A1 | 3/2010 |
| DE | 11 2008 002 935 T5 | 9/2010 |
| DE | 10 2009 042 112 A1 | 3/2011 |
| DE | 10 2011 112 321 B3 | 8/2012 |
| DE | 10 2011 121 392 A1 | 6/2013 |
| EP | 1 564 567 A1 | 8/2005 |
| EP | 2 565 687 A1 | 3/2013 |
| EP | 2 565 688 A1 | 3/2013 |
| GB | 1 310 796 A | 6/1971 |

OTHER PUBLICATIONS

German Search Report, dated Jun. 25, 2014, for corresponding DE Application No. 10 2013 018 784.2, 2 pages.

* cited by examiner

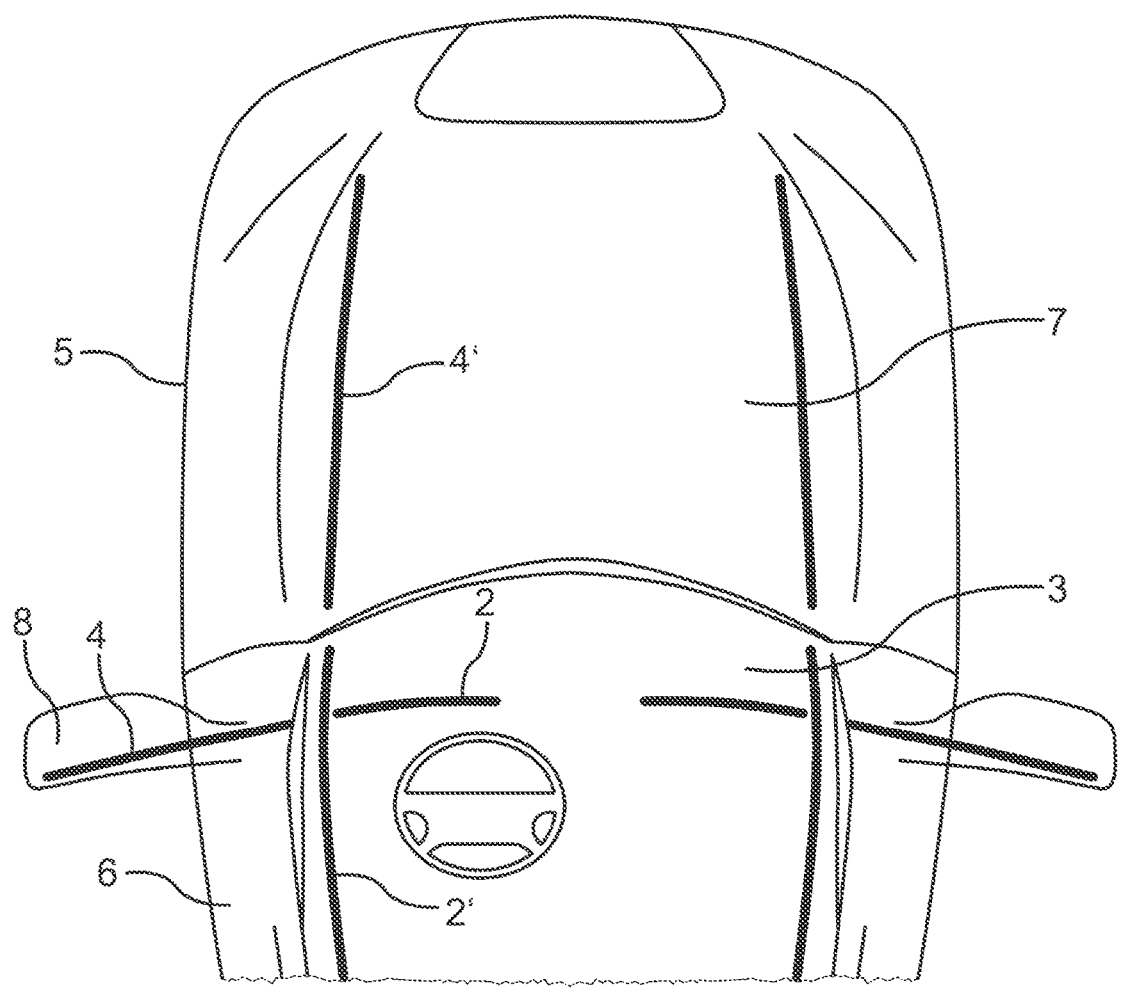

VEHICLE HAVING A LIGHTING DEVICE WITH AN ELONGATE LIGHTING UNIT

The present invention relates to a vehicle with at least one illuminating device having at least one longitudinally shaped illuminating fixture.

Illuminating devices (light elements) are known from the prior art, which are installed on the interior of a vehicle as well as illuminating devices (light elements), which illuminate the exterior of a vehicle. The illuminating devices may, for example, comprise a longitudinally shaped light conductor into which light can be fed.

Thus, DE 10 2009 039 556 A1 describes an illuminating system, particularly for the interior of a vehicle, comprising at least one laterally emitting light conductor, which comprises a fiber bundle of laterally emitting fibers, wherein the fiber bundle is arranged in a transparent plastic sheath all around, in which the laterally emitting fibers move opposite each other, at least in the axial direction. The illuminating system should be particularly suitable for door panels, cockpit modules, consoles, seats, or the headliner of a vehicle.

DE 10 2009 042 112 A1 describes trim for a motor vehicle with a first partial profile and a second partial profile adjoining it, which includes a mounting compartment for an internal unit having an opening toward the outside. With the trim, the inner unit may comprise a lighting unit, for example a longitudinally shaped light conductor that is fed by at least one LED and/or that is equipped with electroluminescent film. The trim should particularly be suitable as exterior trim.

The subject matter of EP 2 565 687 A1 is an illuminating device for creating a light strip along a specified line on a component, comprising a longitudinally shaped light conductor for distributing light along the line, a coupling element for creating the light and for feeding the same into the light conductor, a fixed bearing device by means of which an area of the light conductor is supported in position with respect to the component in a fixed manner, and a floating bearing device by means of which the coupling element is supported so as to move with respect to the component along at least one direction.

And EP 2 565 688 A1 likewise describes an illuminating device for creating a light strip along a specified line, wherein light from a first light source can be distributed along a first section of the line by means of a first light conductor up to an end area of same, and light of a second light source can be distributed along a second section of the line by means of a second light conductor up to an end area of same, and, while doing so, the two end areas are arranged next to each other along the line.

The illuminating devices according to the two latter-mentioned documents may be provided, for example, around a closable opening of a motor vehicle or in a frame for a sunroof.

The object of the present invention is to provide a vehicle, particularly a motor vehicle, with at least one illuminating device, with which previously unachievable advantages can be achieved.

Said object is achieved with the vehicle according to claim 1. Advantageous further embodiments of the invention are the subject matter of the dependent claims.

According to the invention, a vehicle, particularly a motor vehicle, is proposed having at least one illuminating device having a longitudinally shaped illuminating fixture for creating a light strip along a specified line of the illuminating fixture. The vehicle is characterized in that a first section of the illuminating fixture is arranged on the interior of the vehicle and a second section of the illuminating fixture is arranged on the exterior of the vehicle, the illuminating device is set up so as to create a similar light strip along a line of the first and of the second section of the illuminating fixture, and the light of the light strip created by the first section of the illuminating fixture is radiated such that it is visible for an occupant located at a definable position in the interior of the vehicle, and the light of the light strip created by the second section of the illuminating fixture is radiated such that it is visible from a definable position relative with respect to and outside of the vehicle.

The present invention provides for a vehicle with a light strip that illuminates in the same manner both on the interior of the vehicle as well as on the exterior of the vehicle. Said light strip is visible simultaneously both to occupants of a vehicle as well as outside of the vehicle. In this manner, an optionally continuous and uninterrupted transition can be created between the interior and exterior space of a vehicle.

According to the invention, the similar light strip, which is created by the first and the second section of the illuminating fixture, can be used in both an aesthetic as well as informative perspective, wherein both usage purposes can also be implemented simultaneously.

According to a first advantageous further embodiment of the invention, a provision is that the light strip have a definable light color, a definable change of light color, a definable light intensity (luminous intensity), a definable change of light intensity, and/or a definable light duration.

According to a second advantageous further embodiment of the invention, the illuminating device further has a control device for a user, by means of which the illuminating fixture can be switched on or switched off, and/or the light color, the change of light color, the light intensity, the change of light intensity, and/or the light duration can be set. In this manner, a user may, for example, switch the illuminating fixture on or off or adjust the way and manner of the light strip created, in a targeted manner.

According to another advantageous further embodiment of the invention, the illuminating device further has a control unit, by means of which the illuminating fixture can be switched on or switched off as a function of definable conditions, and/or the light color, the change of light color, the light intensity, the change of light intensity, and/or the light duration can be controlled. In this manner, the light strip can be used, for example, in an advantageous manner for information purposes both for the occupants of a vehicle as well as for people and/or devices outside of the vehicle.

In doing so, it is advantageous when the control unit is set up so as to control the illuminating device as a function of a recognized malfunction of the vehicle, a recognized incapacity or limited capacity of the driver, a condition of automated driving, and/or a definable recognized traffic situation.

In an advantageous manner, the illuminating fixture with the vehicle according to the invention comprises at least one longitudinally shaped light conductor, into which light can be fed. In doing so, one or more light-emitting diodes can be provided as a light source with which light can be fed into the at least one longitudinally shaped light conductor of the illuminating fixture.

According to yet another advantageous further embodiment of the invention, the first section and the second section of the illuminating fixture each comprise a longitudinally shaped light conductor and at least one place for light to be fed in is provided with the light conductor of the first section and/or with the light conductor of the second section of the illuminating fixture.

While doing so, a provision may be according to the invention that the second section of the illuminating fixture be arranged fixed in location in or on a component of the vehicle, wherein the component is movable from a first to a second position relative to the first section of the illuminating fixture, and, wherein, light fed into the light conductor of the first and/or second section can be introduced into the light conductor of the respective other section, when the component is in the first position.

The component of the vehicle may be, for example, a vehicle door, a hood, an outside mirror, a liftgate/tailgate/hatch, and/or a trunk lid.

The present invention is explained in more detail in the following using the enclosed drawing.

The figure schematically shows a partial sectional view of a vehicle according to the invention.

The representations in the figure are purely schematic and not done true to scale. Within the figure, similar or equivalent elements have been given the same reference characters.

The exemplary embodiments explained in the following represent preferred embodiments of the present invention. The present invention is obviously not limited to these embodiments.

As shown purely schematically in the figure, the vehicle 1 according to the invention, which particularly may be a motor vehicle, has at least one illuminating device with a longitudinally shaped illuminating fixture for creating a light strip along a definable line of the illuminating fixture.

The vehicle 1 is characterized in that a first section 2, 2' of the illuminating fixture is arranged on the interior 3 of the vehicle 1, and a second section 4, 4' of the illuminating fixture is arranged on the exterior 5 of the vehicle 1. The illuminating device is set up so as to create a similar light strip along a line of the first 2, 2' as well as the second section 4, 4' of the illuminating fixture. The light of the light strip created by the first section 2, 2' of the illuminating fixture is radiated by the illuminating fixture such that it is visible for an occupant located at a definable position in the interior of vehicle 1, and the light of the light strip created by the second section 4, 4' of the illuminating fixture is radiated such that it is visible from a definable position relative to and outside of the vehicle 1.

Illuminating fixtures are shown in the figure on the left and right side of the vehicle 1 (however, with respect to the illuminating fixtures shown on the right-hand side of the figure, adding of the corresponding reference characters has been omitted for reasons of clarity). The vehicle according to the invention may obviously have one or more illuminating fixtures with first 2, 2' and second sections 4, 4', wherein the illuminating fixture(s) may be arranged symmetrically or asymmetrically with respect to each other and/or in reference to the shape of the vehicle 1.

The type of illuminating device on the vehicle 1 according to the invention and the illuminating fixture usable thereon is not limited, and therefore any suitable type of illuminating fixture can be used with which a light strip can be created.

According to a preferred embodiment of the invention, the illuminating fixture comprises at least one longitudinally shaped light conductor, into which light can be fed. The most varied types of longitudinally shaped light conductors are known to one of ordinary skill in the art from the prior art, for example in the form of one or more fiber optics, glass light conductors, plastic fibers, plastic light conductors, in or on which interference sources are available, on which light that is directed through the interior of the light conductor is diffracted or refracted such that it exits laterally out of the light conductor. Essentially any longitudinally shaped light conductor that is currently known or will be known in the future can be used for the present invention.

The type and manner that light is created for the light strip is also not subject to any limitation and thus any suitable type and manner of light creation may be used for the present invention, for example incandescent bulbs, gas discharge lamps, fluorescent lamps, electroluminescence fixtures, etc. According to a preferred embodiment of the invention, one or more light-emitting diodes are provided as light sources with which light can be fed into the at least one longitudinally shaped light conductor of the illuminating fixture. Light-emitting diodes have a long service life and good energy efficiency; light-emitting diodes are known for practically all wavelength ranges of visible light; light-emitting diodes may be arranged in arrays (e.g. RGB LEDs) etc., such that light-emitting diodes currently represent a preferred light source.

There are likewise no limitations for feeding light into the light conductor, and any suitable positions as well as type and manner may be used for the feeding of light into the light conductor. In order to obtain a uniform radiation of light with a longitudinal light conductor, a provision may be, for example, that a light coupling point is provided along the light conductor in definable intervals of, for example, 15 cm, 20 cm, 25 cm, 30 cm, 35 cm, 40 cm, 45 cm, or 50 cm, at which, for example, light is fed into the light conductor at a definable angle. It is also possible to feed in light from the ends of a longitudinally shaped light conductor into the light conductor.

When there is only limited installation space available or when, for example, two longitudinal light conductors abut each other at their ends, it may be advantageous if no light is fed in from the ends of the light conductor/light conductors. The feed-in of light from the ends of the light conductor normally requires an installation space extending in the longitudinal direction of the light conductor, which, for example, may not be available in a vehicle depending on the installation location and/or the length of the light conductor. And if two light conductor fixtures are to be abutting each other at their ends, a feed-in of the light by means of the end or ends of a light conductor may cause a visible interruption in the light strip and thus a dark spot.

Because the light strip or strips created by the illuminating device of the vehicle 1 according to the invention may be used for aesthetic and/or informative purposes, the illuminating device may be set up to create a light strip with a definable light color, a definable change in light color, a definable light intensity, a definable change in the light intensity, and/or a definable light duration.

As previously mentioned, a plurality of light-emitting diodes, for example, may be provided, each of which creates light of differing wavelengths and wherein the light of the plurality of light-emitting diodes can be fed into a light conductor. In this manner, different colors of the light strip can be created through individual activation of the respective light-emitting diodes, and mixed colors and color changes can also be created through a corresponding activation of various light-emitting diodes; likewise, any sequence of a change in the light color, the light intensity (luminous intensity), and/or the light duration, etc. is possible by means of a corresponding activation (e.g. can be implemented through a corresponding programming of a control unit).

In order to operate the illuminating device, the illuminating device further may have, according to an advantageous further embodiment of the invention, a control device (not shown in the figure) for a user, by means of which the illuminating fixture can be switched on or switched off, and/or the light color, the change of light color, the light intensity, the change of light intensity, and/or the light duration, etc. can be set.

The type of control device is not subject to any special limitations, and any suitable type of control device may be provided. For example, a pushbutton, a lever, a touch-sensitive or proximity-sensitive surface (e.g. touchpad, screen) and/or a device with speech recognition may be provided for switching the illuminating fixture on and off. Thus, in a simple case, a light strip can be switched on with a defined light color and light intensity, for example, by means of activating a pushbutton or a lever, and the light strip can be switched back off by again activating the pushbutton or lever or releasing the pushbutton or lever.

In order to adjust the type and manner as to how a light strip should be created by the illuminating fixture as it is switched on, i.e. with which light color, which (optional) change in light color, which light intensity, which (optional) change in light intensity, and/or which light duration, a graphic display may be provided, for example, as a component of the control device in the form of a screen on which the adjustment options and previously set/current settings may be displayed by means of a suitable computer program.

In order to adjust the illuminating fixture, any suitable human-machine interface may be provided, for example in that the just mentioned screen is implemented so as to be contact-sensitive and/or proximity-sensitive, that a touchpad is provided, that a setting is provided by means of a keypad, a joystick, voice control, etc.

The settings undertaken by means of the control device may be stored in a suitable storage device (not shown in the figure) and then created when the illuminating fixture is switched on by means of a suitable control unit in the light strip, in the predefined type and manner. Obviously, more than one type and manner of a light strip can be set and stored and created by means of corresponding control actions on the control device by means of one of the stored light strips. In this manner, various individual sequences/changes in light color, light intensity, etc. of the light strip can be created, stored, and switched on and off, for example.

Particularly when the light strip is also to be used for informative purposes, the illuminating device may further have a control unit, by means of which the illuminating fixture can be switched on or switched off as a function of definable conditions, and/or the light color, the change of light color, the light intensity, the change of light intensity, and/or the light duration can be controlled.

For example, the control unit may control the illuminating device as a function of a recognized malfunction of the vehicle 1, a recognized incapacity or limited capacity of the driver, a condition of automated driving, and/or a definable recognized traffic situation.

When there is a malfunction in the vehicle 1 (e.g. engine defect, tire defect, consumables run dry) detected by means of a suitable sensor device of the vehicle 1 that requires stopping of the vehicle 1, the illuminating fixture can be activated by the control device such that a type of light strip specific for the particular situation can be created and radiated. Due to the fact that the light strip is created similarly by both the first section 2, 2' of the illuminating fixture as well as by the second section 4, 4' of the illuminating fixture, both the occupants of the vehicle 1 (for example the driver) as well as people and/or devices outside of the vehicle 1 are informed of the stopping of the vehicle 1 required due to the malfunction of the vehicle 1, in the same manner.

Devices and methods are known from the prior art with which an incapacitated driver (for example unconscious, heart/circulatory problems) or driver with limited capacity (e.g. tiredness, lack of concentration) can be detected, and corresponding measures can be introduced with the vehicle 1. Even in a case such as this, both the occupants of the vehicle 1 as well as people and/or devices outside of the vehicle 1 can be informed of such a state of the driver and the expected further movement sequence of the vehicle 1 by the present invention.

A further example of an advantageous application of the present invention is the condition of automated driving. During automated driving, systems in the vehicle take over driving tasks from the driver for a definable time and move the vehicle 1 completely automatically. In doing so, according to the current legal situation, the driver must have the possibility of resuming the driving tasks at any time or interrupting automated driving at any time.

Examples of automated driving that are currently under development include automated parking, automated driving with moving traffic (traffic jam, stop and go), and automated driving in a convoy. It is to be expected that automated driving in the future will comprise all areas of movement with a vehicle, for example automated driving along a definable route.

Because the state of automated driving is not easily recognizable for people and/or devices outside of the vehicle 1 (there is a driver in the driver's seat; the vehicle 1 is moving without any discernible particularities in traffic, etc.), it is advantageous when people and/or devices outside of the vehicle 1 are informed of this state by means of the vehicle 1 according to the invention through a corresponding light strip on the vehicle 1.

Because, according to the invention, a similar light strip is created as well by the first section 2, 2' of the illuminating fixture, the driver and any other occupants of the vehicle 1 are also informed or reminded in an advantageous manner of the state of automated driving by means of said light strip.

Special traffic situations and circumstances relevant to driving with a vehicle 1 can already be detected today by means of suitable sensors on the vehicle, for example slipperiness of the driving surface, rain, fog, traffic jams, speed, and distance to vehicles ahead, etc. As soon as such type of traffic situation or such type of circumstance is detected, a corresponding light strip can be created by means of the illuminating device provided on the vehicle 1 according to the invention through a control unit, with the light strip informing both the occupants of the vehicle 1 as well as people and/or devices outside of the vehicle 1 of the traffic situation and/or the conditions.

In a similar manner, the illuminating device provided with the vehicle 1 according to the invention can be used when a relevant traffic situation/condition is received by means of car-to-car communication between vehicles or from an external device (for example, by analog or digital radio waves, e.g. USW (ultra-short wave), DAB+, mobile communications, etc.).

The first section 2, 2' and the second section 4, 4' of the illuminating fixture may be formed as a common, single-piece light conductor body. For example, this single-piece light conductor body may extend from the dashboard to the component partition through the A-column all the way into the A-column and be attached there at the exterior of the A-column. In an advantageous manner, a light strip is created by the light conductor body that provides light up to the respective component partition. In this manner, a "connection" can be established between the two light locations (interior and exterior) in that the illuminating fixture(s) of the illuminating device is/are implemented in an advantageous manner such that it/they provide light up to a component partition that separates the interior and exterior compartment of the vehicle 1 from each other.

Another example is a case in which a single-piece light conductor body extends starting from a front area of the headliner (first section 2, 2' of the illuminating fixture) up to a headlight or a lamp on the vehicle 1 (second section 4, 4' of the illuminating fixture), wherein the light conductor body extends through multiple component partitions.

With such an embodiment of the light conductor body, it may be sufficient as a function of the length and the quality of the light conductor body when, for example, one or more light coupling points are provided in the first section 2, 2' or the second section 4, 4'. The light fed into this light coupling point/these light coupling points is further routed within the light conductor, and light may be emitted from the light conductor at any point at which a light strip is to be created.

Thus, it is possible, for example, for light to be directed from one or more light coupling points with the second section 4, 4' of the illuminating fixture, light to be directed from the exterior 5 of the vehicle 1 to the first section 2, 2' of the illuminating fixture, and thus light to be directed into the interior of the vehicle 1; obviously, the reverse is also possible, i.e. for light to be directed from one or more light coupling points with the first section 2, 2' of the illuminating fixture, light to be directed to the second section 4, 4' of the illuminating fixture, and from there to be radiated into the exterior of vehicle 1.

If the length of the light conducting body and/or the quality thereof is such that an at least approximately uniformly bright light strip cannot be created with the first section 2, 2' or with the second section 4, 4' over the definable line through one or more light coupling points with the first section 2, 2' or with the second section 4, 4', then obviously one or more light coupling points can be provided with the first section 2, 2' and the second section 4, 4'.

With the vehicle 1 according to the invention, there may be a provision, in addition to a single-piece light conductor body, that the first section 2, 2' and the second section 4, 4' of the illuminating fixture each comprise a longitudinally shaped light conductor, and at least one light coupling point be provided with the light conductor of the first section 2, 2' and/or with the light conductor of the second section 4, 4' of the illuminating fixture.

Various configurations are possible when doing so. On one hand, the longitudinally shaped light conductors of the first section 2, 2' and of the second section 4. 4' are arranged and set up with respect to each other such that, for example, light that is emitted from one end of the light conductor of the one section 2, 2', 4, 4' can be directed into the light conductor of the other section 4, 4', 2, 2' in the longitudinal direction, via an end face of the light conductor of the other section 4, 4', 2, 2' aligned and set up in a suitable manner, (for example an alignment of the two end faces with respect to each other that is parallel and at least partially superimposing, wherein the respective interfaces of the light conductor are aligned vertically with respect to the longitudinal sides of the light conductor). In a case such as this, it may be sufficient, for example, if only one of the light conductors has one or more light coupling points into which the light is fed.

If the two sections, 2, 2' and/or 4, 4', of the illuminating fixture each have an independent longitudinally shaped light conductor body and said longitudinally shaped light conductor bodies are spatially arranged and/or separated from each other by component boundaries such that the introduction of light from one light conductor body into the other light conductor body is not possible, the two light conductor connector bodies must have one or more light coupling points. In doing so, care must only be taken to ensure that a similar light strip is created by the illuminating device for the two longitudinally shaped light conductors.

A multi-piece light conductor body, i.e. a separate light conductor body both in the first section 2, 2' and also in the second section 4, 4' of the illuminating fixture is then particularly advantageous when, as is provided for according to an advantageous further embodiment of the vehicle 1 according to the invention, the second section 4, 4' of the illuminating fixture is arranged fixed in position or on a component of the vehicle 1, wherein the component can be moved from a first into a second position relative with respect to the first section 2, 2' of the illuminating fixture. In doing so, the component of the vehicle 1 may be, for example, a vehicle door 6, a hood 7, an outside mirror 8, a liftgate/tailgate/hatch, and/or a trunk lid.

For example, the illuminating fixture may extend starting from the dashboard or the center console of a vehicle 1 all the way into the housing of an outside mirror 8. The housings for an outside mirror are generally mounted so as to move in order, for example, to enable the outside mirror to fold in.

Other examples comprise cases in which the second section 4, 4' of the illuminating fixture is arranged in/on a vehicle door 6, a hood 7, a liftgate/tailgate/hatch, and/or a trunk lid.

In doing so, as previously explained, a provision may be that light fed into the light conductor of the first 2, 2' and/or second 4, 4' section can be fed into the light conductor of the respective other section when the component is in the first position, i.e. opposite ends of the respective light conductors in the first position are arranged with respect to each other such that light, which is emitting from the end of a light conductor, can be fed into the end of the other light conductor.

If in such a case a provision is that light is only fed into one of the two light conductors, for example into the light conductor of the first section 2, 2', a light strip only results with the second section 4, 4' of the illuminating fixture when the component is in the first position. Or vice versa when, for example, light is only fed into the light conductor of the second section 4, 4', a light strip only results with the first section 2, 2' of the illuminating fixture when the component is in the first position.

Such type of embodiment may be used, for example, in an advantageous manner to inform an occupant of the vehicle 1 as to whether, for example, a vehicle door 6, a hood 7, a liftgate/tailgate/hatch, and/or a trunk lid is properly closed (i.e. is in a first position). If, for example, light is only being fed into the light conductor of the second section 4, 4', a light strip is only created with the first section 2, 2' of the illuminating fixture (which is perceivable by an occupant of the vehicle 1) when the corresponding component of the vehicle 1 is in a definable first position, i.e. is properly closed in this case. With an outside mirror 8, the proper and complete extension of the outside mirror housing is indicated in that a light strip with the first section 2, 2' of the illuminating fixture is visible.

Of course, the invention also covers the reverse case, i.e. if light is only being fed into the light conductor of the first section 2, 2', a light strip with the second section 4, 4' of the illuminating fixture (which is perceivable from a position relative to and outside of the vehicle 1) is then only created when the corresponding component of the vehicle 1 is in a definable first position. This then makes it possible, for example, to have an inspection of the proper position of the corresponding component by a person or device from outside of the vehicle 1.

The light strip, which is perceivable from a position relative to and outside of the vehicle 1, of the second section 4, 4' of the illuminating fixture of the vehicle 1 according to the invention obviously cannot only be seen by people outside of the vehicle 1, but also detected and evaluated by corresponding devices from other vehicles and/or equipment for traffic control/traffic inspection, vehicle inspection, etc.

The corresponding devices, such as, for example, camera systems with corresponding image evaluation software, are known to one of ordinary skill in the art such that it is not necessary to discuss this in more detail in the present application at this time.

Obviously, the vehicle 1 according to the invention may have a plurality of illuminating devices, with each having at least one longitudinally shaped illuminating fixture according to the present invention. This enables light strips to be created at various points on the interior and exterior of the vehicle 1 with the vehicle 1 according to the invention. The light strips created by the various illuminating devices may obviously be created so as to alternate, according to a definable chronological sequence, etc.

An illuminating device may obviously also have multiple illuminating fixtures such that, for example, one or more light strips can be created on the interior of a vehicle 1 and one or more light strips can be created on the exterior 5 of the vehicle 1, for example, by means of an illuminating device. For example, a provision may be that each longitudinally shaped, optionally animated light strip can be created by one illuminating device for both headlights or for all turn signals of the vehicle 1, but only one corresponding light strip is created in the interior of the vehicle 1.

The illuminating fixtures of the illuminating device may be installed at any suitable points on the interior (for example dashboard, instrument panel, center console, door lining, roof), or on the exterior 5 of the vehicle 1 (for example, front side, rear, side areas, roof area).

As previously explained in the description at the beginning, illuminating devices (light elements) are known from the prior art that are installed on the interior of a vehicle 1, as well as those illuminating devices (light elements) that illuminate the exterior of a vehicle 1.

A connection can be established between these two light types, in a novel manner, by means of the present invention. In order to establish a "connection" between the two light locations, the illuminating fixtures of the illuminating device are implemented in an advantageous manner such that they provide light up to a component partition that separates the interior and exterior compartment of the vehicle 1 from each other. In order to avoid dark points, there may be a provision such that the illuminating fixtures are not separated from each other by light coupling points.

In order to indicate warnings or intentions (e.g. turn signals), the light (the light strip) may depict a continuous transition between the interior and exterior space by means of animations that are controlled by programming.

Thus, a driver may, for example, first be made aware of a pedestrian (for example by means of a display on the screen, a heads-up display) and, due to the animation that goes from the interior all the way to the exterior (exterior 5) of the vehicle 1, the pedestrian may also be warned.

In addition, information from the vehicle 1 may be transmitted and/or indicated to the environment by the present invention. This may be advantageous, for example, for information or an information exchange in a phase of automated driving in order to transfer information optically between vehicles or between occupants of vehicles.

The invention claimed is:

1. A motor vehicle, comprising:
   at least one illuminating device having a longitudinally shaped illuminating fixture that forms a light strip along a specified line of the illuminating fixture, the illuminating fixture including:
   a first section arranged on an interior of the vehicle; and
   a second section arranged on an exterior of the vehicle,
   the illuminating device configured to create the light strip along the line of the first and the second section of the illuminating fixture, and
   the first section of the illuminating fixture being configured to radiate light that it is visible for an occupant located at a definable position on the interior of the vehicle, and the second section of the illuminating fixture being configured to radiate light that it is visible from a definable position relative to and outside of the vehicle, and the first section and the second section of the illuminating fixture are formed as a common, single-piece light conductor body, which extends through at least one component partition.

2. The vehicle according to claim 1, wherein the light strip of the illuminating fixture has at least one from among a light color, a change of light color, a light intensity, a change of light intensity, and a light duration.

3. The vehicle according to claim 2, wherein the illuminating device further includes a control device for a user, by means of which the illuminating fixture can be switched on or switched off, and the light color, the change of light color, the light intensity, the change of light intensity, and the light duration can be set.

4. The vehicle according to claim 2, wherein the illuminating device further includes a control unit, by means of which the illuminating fixture can be switched on or switched off as a function of definable conditions, and the light color, the change of light color, the light intensity, the change of light intensity, and the light duration can be controlled.

5. The vehicle according to claim 4, wherein the control unit is configured to control the illuminating device as a function of at least one from among a recognized malfunction of the vehicle, a recognized incapacity or limited capacity of the driver, a condition of automated driving, and a definable recognized traffic situation.

6. The vehicle according to claim 1 wherein the illuminating device includes at least one longitudinally shaped light conductor into which light can be fed.

7. The vehicle according to claim 6, wherein one or more light-emitting diodes are provided as a light source with which light can be fed into the at least one longitudinally shaped light conductor of the illuminating fixture.

8. The vehicle according to either claim 6, wherein the first section and the second section of the illuminating fixture each comprise a longitudinally shaped light conductor, and at least one light coupling point is provided with the light conductor of the first section or with the light conductor of the second section of the illuminating fixture.

9. The vehicle according to claim 8, wherein the second section of the illuminating fixture is arranged fixed in location in or on a component of the vehicle, wherein the component is movable from a first to a second position relative to the first section of the illuminating fixture, and, wherein, light fed into the light conductor of the first or second section can be introduced into the light conductor of the respective other section, when the component is in the first position.

10. The vehicle according to claim 9, wherein the component of the vehicle is one from among a vehicle door, a hood, an outside mirror, a liftgate, a tailgate, a hatch, and a trunk lid.

\* \* \* \* \*